(12) United States Patent
Larsen

(10) Patent No.: US 6,652,286 B1
(45) Date of Patent: Nov. 25, 2003

(54) TEACHING DEVICE

(76) Inventor: Timmy L. Larsen, 310 Liri La., Council Bluffs, IA (US) 51503

(*) Notice: Subject to any disclaimer, the term of this patent is extended or adjusted under 35 U.S.C. 154(b) by 0 days.

(21) Appl. No.: 10/171,115

(22) Filed: Jun. 13, 2002

(51) Int. Cl.$^7$ .............................. G09B 3/00; G09B 7/00
(52) U.S. Cl. ...................... 434/348; 434/324; 40/492; 353/27 R
(58) Field of Search ................. 434/348, 324; 353/27 R; 40/492

(56) References Cited

U.S. PATENT DOCUMENTS

| | | | |
|---|---|---|---|
| 1,641,982 A | | 9/1927 | McDade |
| 2,634,132 A | | 4/1953 | Freedman |
| 2,693,646 A | * | 11/1954 | Hawkins ................. 434/348 |
| 3,097,435 A | * | 7/1963 | Goldschmidt ............ 434/348 |
| 3,206,872 A | * | 9/1965 | Nason et al. ............ 434/348 |
| 3,230,641 A | * | 1/1966 | Sloves ................... 434/348 |
| 3,253,358 A | | 5/1966 | Wright |
| 3,339,288 A | | 9/1967 | Sacks |
| 3,342,101 A | * | 9/1967 | Zollner ..................... 353/44 |
| 3,412,480 A | * | 11/1968 | Connell ................... 434/324 |
| 3,425,148 A | * | 2/1969 | Reese ...................... 40/701 |
| 3,432,943 A | | 3/1969 | Merkel |
| 3,435,541 A | | 4/1969 | Tacey |
| 3,531,193 A | * | 9/1970 | Diehl ....................... 352/87 |
| 3,541,702 A | * | 11/1970 | Cohen ..................... 434/348 |
| 3,579,854 A | * | 5/1971 | Tusson .................... 434/348 |
| 3,661,449 A | * | 5/1972 | Wright .................... 353/120 |
| 3,789,517 A | | 2/1974 | Romstad |
| 3,950,871 A | * | 4/1976 | Rege ....................... 40/492 |
| 4,015,345 A | | 4/1977 | Rice, Jr. |
| 4,679,923 A | | 7/1987 | Nielsen |
| D309,162 S | | 7/1990 | Swalwell |
| 4,973,254 A | | 11/1990 | Bracconier |
| 5,451,163 A | | 9/1995 | Black |
| 5,590,944 A | * | 1/1997 | Stokes ..................... 353/122 |
| 5,746,603 A | | 5/1998 | Foster et al. |

* cited by examiner

*Primary Examiner*—Derris H. Banks
*Assistant Examiner*—Dmitry Suhol
(74) *Attorney, Agent, or Firm*—Thomte, Mazour & Niebergall; Shane M. Niebergall

(57) ABSTRACT

A teaching device is provided for use with an overhead projector to display educational problems to a group of students. The solutions to the problems are selectively concealed and revealed by the teacher through the use of a solution cover. A plurality of embodiments is provided disclosing different methods of moving the solution cover between concealing and revealing positions. The teaching device is adaptable for use with different types of overhead projectors as needed.

8 Claims, 3 Drawing Sheets

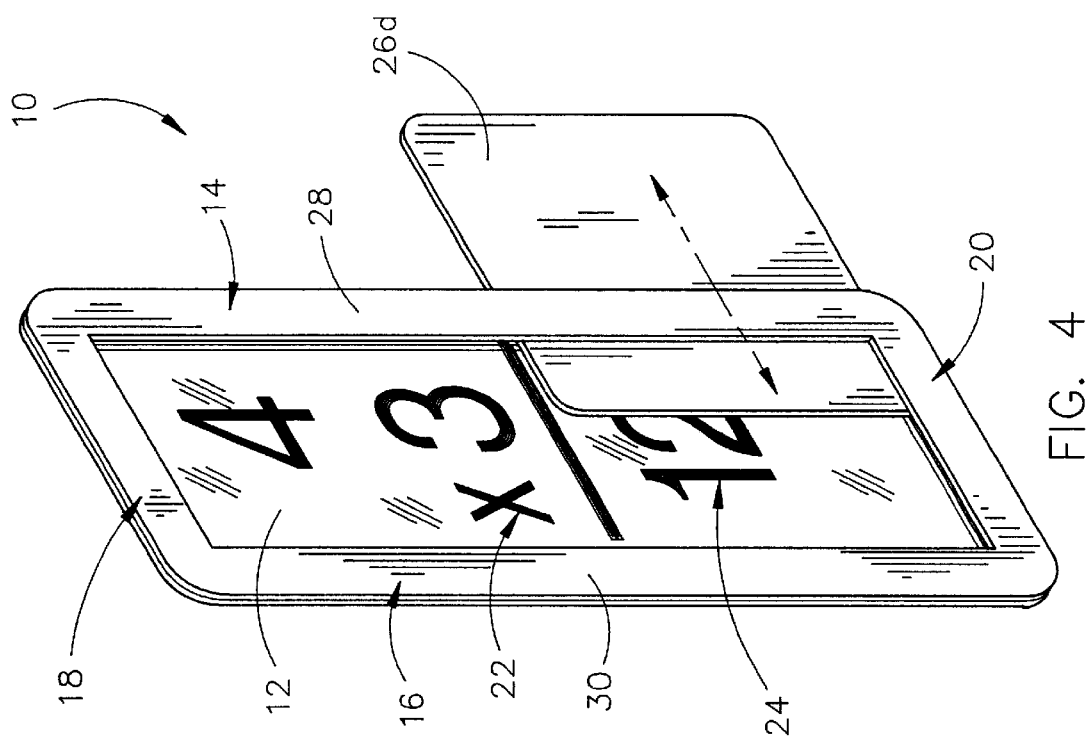
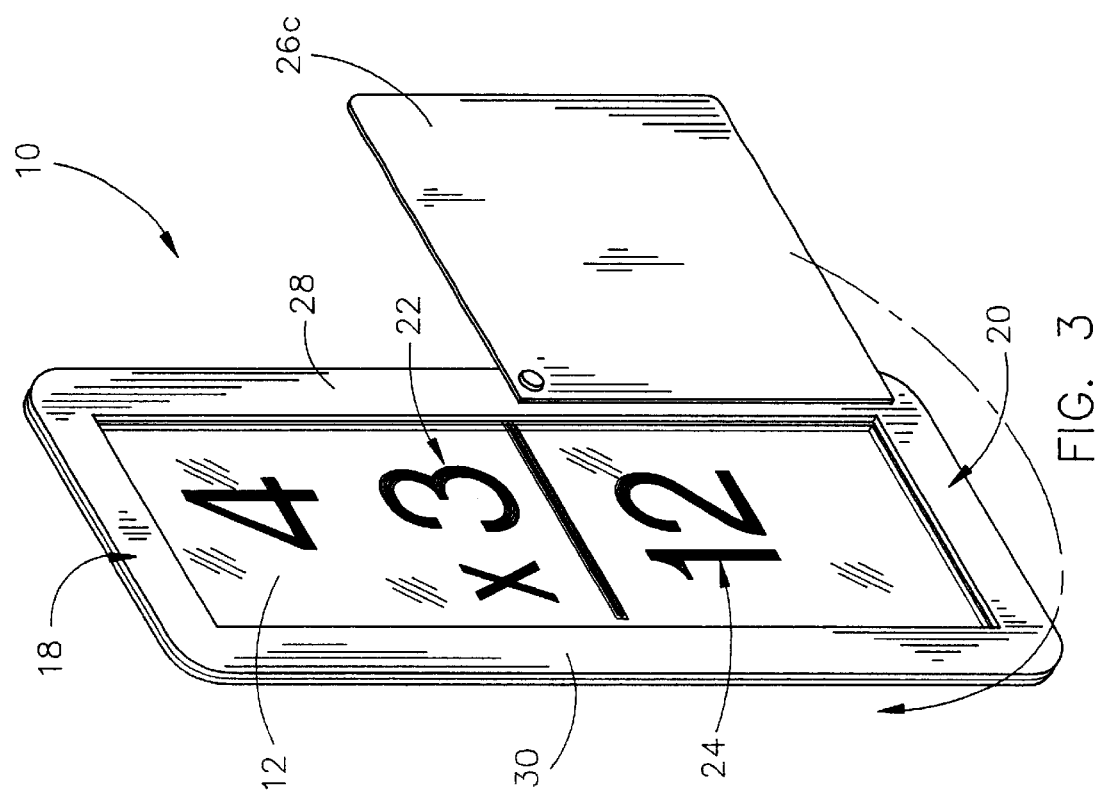

TEACHING DEVICE

BACKGROUND OF THE INVENTION

1. Field of the Invention

This present invention relates to teaching devices, and more particularly to a teaching device for displaying educational problems to a group of students while allowing the user to selectively conceal and reveal the solutions to the problems to the students.

2. Description of the Prior Art

Over the years, teachers have devised different interactive methods of teaching lessons to their students in order to increase the students' level of participation and better facilitate the teaching process. The use of blackboards and chalk has given way to the more common use of overhead projectors to present mathematical, grammatical, and scientific problems to a classroom of students. However, time spent in the classroom erasing and writing problems on blackboards and transparencies takes away from valuable teaching time. Moreover, such methods lack the repetitive reinforcement of other methods such as the use of display cards having problems written on one side and the answers written on the opposite side. Unfortunately, display cards are difficult to use in groups of more than a handful of students due to their small size.

Accordingly, what is needed is a teaching device and method of using the same that quickly and effectively displays educational problems to a classroom of students while allowing the teacher to selectively conceal and display the solutions to the problems.

SUMMARY OF THE INVENTION

A teaching device and method of using the same is disclosed for quickly and effectively displaying educational problems to a classroom of students. The teaching device allows the teacher to selectively conceal and display the problem solutions to the students in a manner that facilitates repetitive reinforcement methods of learning.

The teaching device is comprised of a generally planar sheet of material having an educational problem and solution disposed thereon. A solution cover is provided to allow the solution to be concealed while students attempt to solve the problem. A plurality of embodiments is provided that allow the solution cover to be moved in different manners from a concealing to a revealing position, allowing the students to see the solution. To allow an entire classroom to receive the benefit of the use of the teaching device, it is preferably used in conjunction with an overhead projector. The materials used in the manufacture of the teaching device will dictate the type of overhead projector used to display the problems and solutions.

Accordingly, it is one of the primary objectives of the invention to provide a teaching device that quickly and effectively displays educational problems to a group of students.

Yet another object of the invention is to provide a teaching device that allows the user to selectively conceal and reveal solutions to a series of problems to a group of students.

Still another object of the invention is to provide a teaching device that is used in conjunction with an overhead projector to display educational problems and solutions to a group of students.

Still another object of the invention is to provide a teaching device that allows a teacher to use repetitive reinforcement methods of teaching for a group of students.

Yet another object of the invention is to provide a teaching device that is adaptable for use with different types of overhead projectors to teach a group of students.

Still another object of the invention is to provide a novel type of educational display card for use with an overhead projector to teach a plurality of different subjects.

These and other objects will be apparent to those skilled in the art.

BRIEF DESCRIPTION OF THE DRAWINGS

FIG. 3 is a perspective view of an alternate embodiment of the teaching device of this invention in a solution revealing position;

FIG. 4 is a perspective view of another alternate embodiment of the teaching device of this invention in a solution revealing position;

DESCRIPTION OF THE PREFERRED EMBODIMENT

Figures 1, 2:
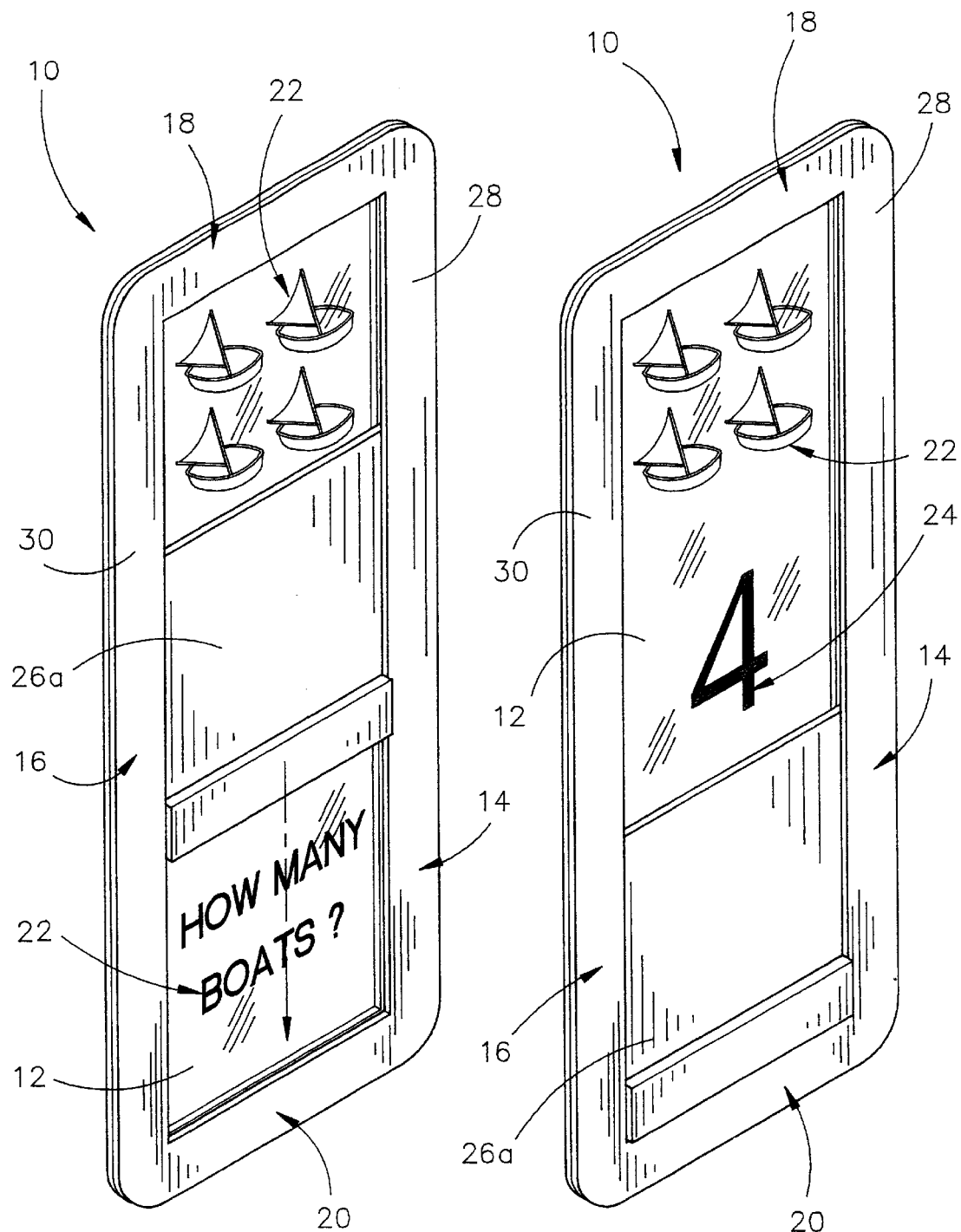
FIG. 1 is a perspective view of one embodiment of the teaching device of this invention in a solution concealing position.
FIG. 2 is a perspective view of the teaching device of FIG. 1 in a solution revealing position.

FIG. 1 generally depicts one embodiment of the teaching device 10 of this invention. The teaching device 10 is provided with a generally planar sheet member 12 having first and second side portions 14 and 16 and first and second end portions 18 and 20. First indicia 22, which depicts at least one educational problem, is disposed on the sheet member 12. Second indicia 24 is disposed on the sheet member 12 adjacent the first indicia 22. The second indicia 24 is preferably in the form of a solution to the problem. Although the teaching device 10 is shown in FIG. 1 as depicting a mathematical problem, it is contemplated that nearly any subject can be taught using the present invention. Examples of the subjects that could be taught include math, grammar, science, social studies, foreign language, health studies, etc.

Figure 6:
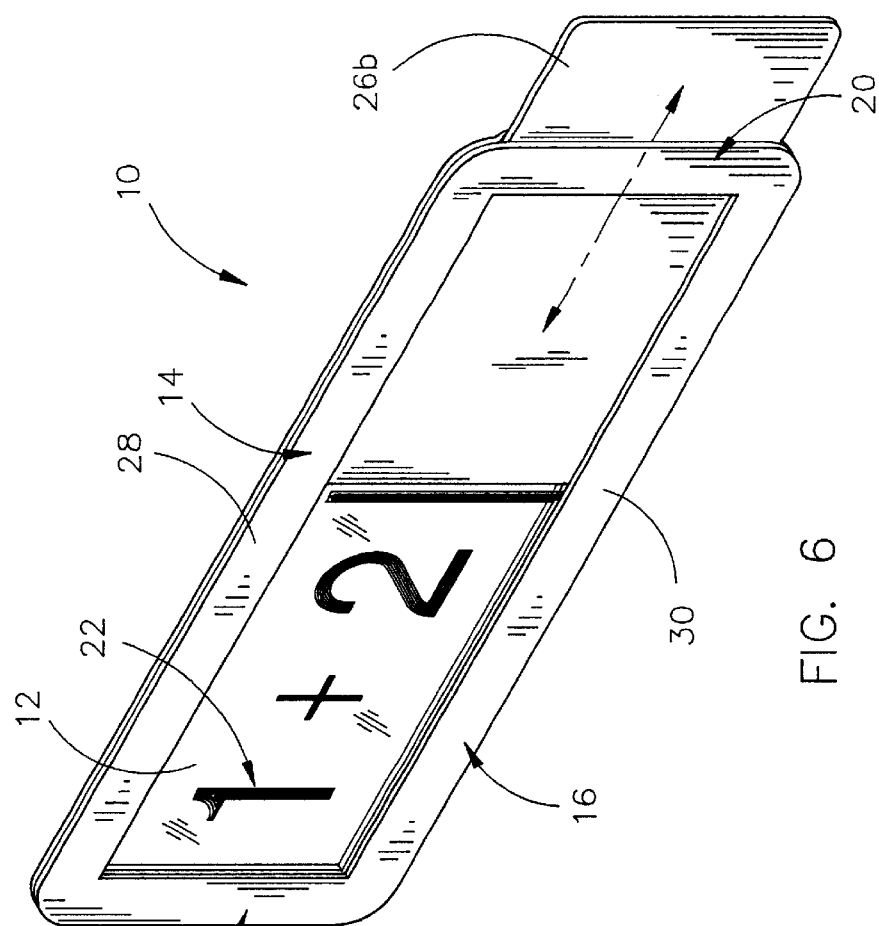
FIG. 6 is a perspective view of still another alternate embodiment of the teaching device of this invention in a solution revealing position.

A solution cover 26 is positioned adjacent the sheet member 12 and the second indicia 24 to selectively prevent the students from seeing at least the second indicia 24 until they have had an opportunity to respond to the problem illustrated by the first indicia 22. As can be seen in FIGS. 1 through 6, several different embodiments of solution cover 26 are contemplated. FIGS. 1, 2 and 6 illustrate embodiments similar to one another, where the teaching device 10 is provided with first and second spacedapart rail members 28 and 30 that are secured to the first and second side portions 14 and 16 of the sheet member 12. In FIGS. 1 and 2, the solution cover 26a is retained by the first and second rail members 28 and 30 so that the solution cover is maintained adjacent to the sheet member 12 while still being slideably movable between concealing and revealing positions in a direction generally parallel to the first and second rail members 28 and 30 between the first and second end portions 18 and 20.

The solution cover 26b in FIG. 6 is coupled to the sheet member 12 and first and second rail members 28 and 30 in a manner similar to solution cover 26a. However, solution cover 26b is provided in an elongated shape that can selectively cover both the first indicia 22 and the second indicia 24. To selectively reveal the first indicia 22 and then the second indicia 24, the teacher moves the solution cover 26b in a direction generally parallel to the first and second rail members 28 and 30 at least partially beyond one of the end portions 18 or 20 of the sheet member 12.

In FIG. 3, the solution cover 26c is secured to the sheet member 12 using a pin 32. Accordingly, solution cover 26c is selectively movable between concealing and revealing positions by pivoting the solution cover 26c about pin 32. Although the first and second rail members 28 and 30 are shown in FIG. 3, they are not required for the operation of the solution cover 26c. As with the solution cover 26b in FIG. 6, it is contemplated that the solution cover could be elongated to cover both the first indicia 22 and the second indicia 24 where desirable.

In FIG. 4, the solution cover 26d is retained by the first rail member 28 (although it could be just as easily retained by the second rail member 30 instead) so that the solution cover 26d is maintained adjacent to the sheet member 12 while still being slideably movable between concealing and revealing positions in a direction generally perpendicular to the first rail member 28.

Figure 5:
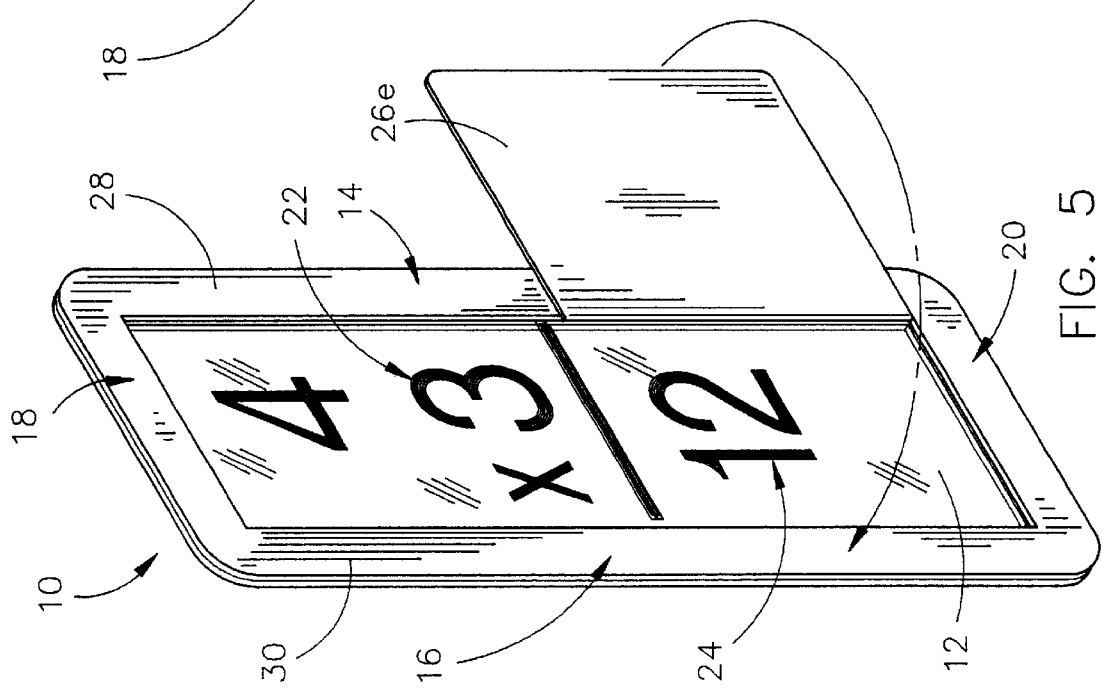
FIG. 5 is a perspective view of yet another alternate embodiment of the teaching device of this invention in a solution revealing position.

In FIG. 5, the solution cover 26e is hingedly secured to the teaching device 10 to open in a door-like fashion. It is contemplated that the solution cover could be hingedly secured to the sheet member 12, adjacent one of the first or second side portions 14 and 16 or the first or second end portions 18 and 20, or to one of the rail members 28 or 30. As with the solution cover 26b in FIG. 6, it is contemplated that the solution cover could be elongated to cover both the first indicia 22 and the second indicia 24 where desirable.

It is contemplated that the solution cover 26 could be separate from the teaching device 10 entirely, thus not requiring the methods of coupling the solution cover 26 to the teaching device 10 as depicted in FIGS. 1 through 6. In that instance, the teacher would still simply move the solution cover accordingly to conceal and reveal the second indicia 24.

It will be understood by those of skill in the art that the teaching device 10 could be used in small settings in a manner similar to that of traditional display cards. However, it is preferred that the teaching device 10 be used in combination with an overhead projector. Such a manner of use allows for the first and second indicia 22 and 24 to be seen more easily by those students who are further away from the teacher than other students. The type of overhead projector used may dictate the materials used to assemble the teaching device 10. For example, the traditional overhead projector having a light emitting base and a lens assembly vertically spaced from the base will require that the sheet member 12 be comprised of a generally transparent material to properly project the first and second indicia 22 and 24. However, where the overhead projector being used is similar to an Elmo projector that uses a camera that is vertically spaced from the base to receive the image of the teaching device 10 and then transmit the image to a display, the sheet member 12 can be made from virtually any material which is transparent or opaque.

In the drawings and in the specification, there have been set forth preferred embodiments of the invention; and although specified items are employed, these are used in a generic and descriptive sense only and not for purposes of limitation. Changes in the form and proportion of parts, as well as substitution of equivalents, are contemplated as circumstances may suggest or render expedient without departing from the spirit or scope of the invention as further defined in the following claims.

Thus, it can be seen that the invention accomplishes at least all of its stated objectives.

I claim:

1. In combination with an overhead projection device, a teaching device, comprising:

a plurality of sheet members having first and second side portions and first and second end portions;

a plurality of printed problems; only one of said plurality of problems being disposed on each of said sheet members;

a plurality of printed solutions; only one of said plurality of solutions disposed on each of said sheet members;

a plurality of first and second spaced-apart rail members connected to the first and second side portions of each of said sheet members; and a plurality of solution covers; only one of said plurality of solution covers being connected to each of said first rail members and positioned adjacent said solution to selectively prevent said solution from being optically received and projected by the overhead projection device while permitting said problem to be optically received and projected by the overhead projection device.

2. The combination of claim 1 wherein said solution covers are operatively hingedly connected to said first rail members so that said solution covers can be selectively moved between concealed and revealing positions with respect to said solutions.

3. The combination of claim 1 further comprising a plurality of pins; only one of said plurality of pins being connected to each of said first rail members; said solution covers being operatively pivotably connected to said pins so that said solution covers can be selectively moved between concealed and revealing positions with respect to said solutions.

4. The combination of claim 1 wherein each of said plurality of solution covers are operatively slidably connected to a pair of said plurality of first and second spaced-apart rails so that each of said plurality of solution covers can be selectively moved in a direction that is generally parallel with said pair of first and second spaced-apart rails.

5. The combination of claim 4 wherein said each of said plurality of solution covers are selectively movable along said pair of first and second spaced-apart rails between the first and second end portions of one of said plurality of sheet members.

6. The combination of claim 4 wherein each of said plurality of solution covers are selectively movable along said pair of first and second spaced-apart rails and at least partially beyond one of the first and second end portions of one of said plurality of sheet members.

7. The combination of claim 1 wherein each of said plurality of solution covers are operatively slidably connected to one of said plurality of first and second spaced-apart rails so that each of said plurality of solution covers can be selectively moved in a generally perpendicularly direction with respect to said first and second spaced-apart rails.

8. The combination of claim 1 wherein said plurality of sheet members are generally transparent.

* * * * *